United States Patent
Sako

(10) Patent No.: US 7,609,597 B2
(45) Date of Patent: Oct. 27, 2009

(54) APPARATUS FOR RECORDING OR REPRODUCING RECORD MEDIUM AND METHOD FOR CONTROLLING DATA OUTPUT

(75) Inventor: Yoichiro Sako, Tokyo (JP)

(73) Assignee: Sony Corporation (JP)

( * ) Notice: Subject to any disclaimer, the term of this patent is extended or adjusted under 35 U.S.C. 154(b) by 6 days.

(21) Appl. No.: 10/276,628

(22) PCT Filed: Mar. 29, 2002

(86) PCT No.: PCT/JP02/03217

§ 371 (c)(1),
(2), (4) Date: Apr. 7, 2003

(87) PCT Pub. No.: WO02/080172

PCT Pub. Date: Oct. 10, 2002

(65) Prior Publication Data

US 2003/0185125 A1     Oct. 2, 2003

(30) Foreign Application Priority Data

Mar. 30, 2001    (JP)  ............................. 2001-100636

(51) Int. Cl.
*G11B 7/00*     (2006.01)
(52) U.S. Cl. ................. 369/53.21; 369/47.12
(58) Field of Classification Search ............. 369/53.21, 369/47.12, 47.13
See application file for complete search history.

(56) References Cited

U.S. PATENT DOCUMENTS 6,038,207 A * 3/2000 Wachi ..................... 369/275.1
6,320,829 B1 * 11/2001 Matsumoto et al. ...... 369/47.12
6,351,439 B1 * 2/2002 Miwa et al. .............. 369/47.18
6,628,591 B1 * 9/2003 Yokota et al. ............ 369/53.21
6,687,683 B1 * 2/2004 Harada et al. ................ 705/51
6,687,802 B1 * 2/2004 Kori et al. .................... 711/163
6,810,200 B1 * 10/2004 Aoyama et al. ............... 386/94

FOREIGN PATENT DOCUMENTS

| JP | 2000-003559 | * | 1/2000 |
| JP | 2000-182321 | * | 6/2000 |
| JP | 2000-357371 | * | 12/2000 |

OTHER PUBLICATIONS

Electronic translation of JP 2000-357371.*

* cited by examiner

*Primary Examiner*—Wayne R Young
*Assistant Examiner*—Lixi Chow
(74) *Attorney, Agent, or Firm*—Lerner, David, Littenberg, Krumholz & Mentlik, LLP

(57) ABSTRACT

A data outputting controlling method in which content identification information for discriminating the content of content data is held each time the content data is read out and output from a recording medium, having at least the content identification information stored along with the content data, and in which the outputting of the content data as read out from the recording medium is controlled depending on whether the content identification information that is held meets a preset condition. Specifically, the outputting of the content data is controlled on the basis of the numbers of the content identification information and the medium identification information that is held.

5 Claims, 5 Drawing Sheets

APPARATUS FOR RECORDING OR REPRODUCING RECORD MEDIUM AND METHOD FOR CONTROLLING DATA OUTPUT

TECHNICAL FIELD

This invention relates to a recording and/or reproducing apparatus for a recording medium and to a data outputting controlling method. More particularly, it relates to a recording and/or reproducing apparatus for a recording medium on which content data has been or is to be recorded, and to a data outputting controlling method.

BACKGROUND ART

With an increasing recording capacity of a digital recording medium, such as an optical disc, and with coming into popular use of this sort of the recording medium, it becomes necessary to take measures against unauthorized copying of signals recorded on the recording medium, in order to protect the copyright of the recorded signals. That is, if the signals are digital audio data or digital video data, duplications free of data deterioration can be easily produced by copying or dubbing from the digital data or the digital signals. In the case of data handled by a data processing apparatus, such as a computer, the data which are the same as the original data can be easily obtained on copying or dubbing, so that troubles such as infringement of the copyright by such unauthorized copying have already come to the surface.

In this consideration, data indicating preset copying inhibition may be recorded in an original digital recording medium, in order to prevent the aforementioned unauthorized copying in so-called digital dubbing in which digital signals recorded on a digital recording medium and reproduced are re-recorded on another digital recording medium.

For example, in a system for preventing unauthorized copying as used in the digital audio signal recording and/or reproducing apparatus termed R-DAT (Rotary Head Digital Tape Recorder), an inhibiting code for inhibiting digital copying or serial generation copying by way of so-called generation limitation (Serial Copy Management System or SCMS) is recorded in a main data area for digital audio signals recorded on a digital audio tape as the digital recording medium. If, in recording, the digital audio signal recording apparatus has detected this inhibiting code, recording by copying of the digital audio signals, contemplated to be copied on a new digital audio tape, is inhibited.

In a dubbing system in which digital signals reproduced from signals recorded on a digital recording medium are re-recorded on another digital recording medium, it is sometimes attempted to protect the copyright by limiting the number of copies of the contents on digital recording mediums.

Meanwhile, if such limitation of the number of copies of the contents on the digital recording medium is to be made on the basis solely of the content identification information, the number of the copies of the contents is not larger than the allowed number of copies even if the user owns plural digital recording mediums having the same contents recorded thereon. That is, the recording apparatus, supplied with the same content, has already memorized that the recording of the contents has already been made, but cannot distinguish from which recording medium the contents now to be recorded is originated. Consequently, the apparatus cannot produce the number of copies which is more than the number allowed for given contents.

The conventional copying management system is not designed so as to control the outputting of the content data on the part of the reproducing apparatus reproducing the digital recording medium, so that it has been difficult to construct a system operating in such a manner as to reliably inhibit unauthorized copying of content data.

DISCLOSURE OF THE INVENTION

It is an object of the present invention to provide a recording and/or reproducing apparatus for a recording medium capable of reliably protecting content data recorded on a recording medium, and a data output controlling method.

It is another object of the present invention to provide a recording and/or reproducing apparatus for a recording medium for reliably controlling unauthorized copying of content data recorded on the recording medium, and for allowing content data to be copied without impairing the benefits of a user who properly acquired the recording medium, and a data output controlling method.

It is yet another object of the present invention to provide a recording and/or reproducing apparatus for a recording medium in which, in reproducing a recording medium, having content data recorded thereon, the outputting reproduced of the content data to outside the apparatus is controlled to prevent content data recorded on the recording medium from being limitlessly supplied to the recorder in order to assure more reliable protection against unauthorized copying, and a data output controlling method.

For accomplishing the above object, the present invention provides a reproducing apparatus for a recording medium including a head for scanning the recording medium, having recorded thereon content data and the content identification information for discriminating at least the content of the content data, a reproducing processing unit for processing an output signal from the head and for reproducing the content data, an identification information extracting unit for extracting the identification information from an output signal from the head, and an output controlling unit for controlling the outputting from the reproducing processing unit depending on whether or not the content identification information extracted by the identification information extracting unit meets a preset condition.

Preferably, the output controlling unit includes a storage unit for holding the content identification information extracted by the identification information extracting unit each time the content data is output from the apparatus, and wherein the output controlling unit controls the outputting of the content data from the reproducing processing unit based on the number of the content identification information as stored in the storage unit.

Preferably, there is provided an authentication unit for authenticating an external equipment supplied with the content data from the reproducing processing unit. The output control unit controls the outputting of the content data from the reproducing processing unit, based on the number of the content identification information as stored in the storage unit, when the authentication of the external equipment has been made correctly by the authentication unit.

The present invention also provides a data outputting controlling method including holding, each time content data read out from a recording medium, having recorded thereon content data and the content identification information discriminating at least the content of the content data, is output, the content identification information read out along with the content data, and controlling the outputting of the content data read out from the recording medium depending on whether or not the content identification information meets a preset condition.

In the data outputting controlling method, an external equipment supplied with the content data is authenticated at the time of outputting the content data, and the outputting of the content data is controlled on the basis of the number of the content identification information, as held, when the external equipment has been correctly authenticated by the authentication processing.

Preferably, the recording medium has further recorded thereon the medium identification information proper to the recording medium, and wherein the content identification information is held as a set with the medium identification information read out from the recording medium.

The present invention also provides a recording apparatus for a recording medium including a recording processing unit for performing signal processing for recording on content data supplied, and a head for recording output data supplied from the recording processing unit on a recording medium, and a supply controller for controlling whether or not the content data is to be supplied to the recording processing unit depending on whether or not the content discriminating identification information for discriminating the content in the content data supplied along with the content data meets a preset condition. Preferably, the supply controller includes a storage unit for holding the content identification information each time the content data is supplied to the recording processing unit. The supply controller controls the supply of the content data to the recording processing unit based on the number of the content identification information as stored in the storage unit.

Preferably, the supply controller includes a controller and a switching unit controlled in a changeover fashion by the controller, the controller controlling the switching unit controlling the switching unit in a changeover fashion based on the number of the content identification information stored in the storage unit.

The present invention also provides a data outputting controlling method including holding the identification information proper to content data, read out along with the content data, each time the content data read out from the recording medium, on which at least the content identification information proper to the content data has been stored along with the content data, is output, and controlling the outputting of the content data, at the time of outputting the content data, depending on whether or not the content identification information for the output content data as held meets a preset condition.

Other objects, features and advantages of the present invention will become more apparent from reading the embodiments of the present invention as shown in the drawings.

BEST MODE FOR CARRYING OUT THE INVENTION

Figure 1:
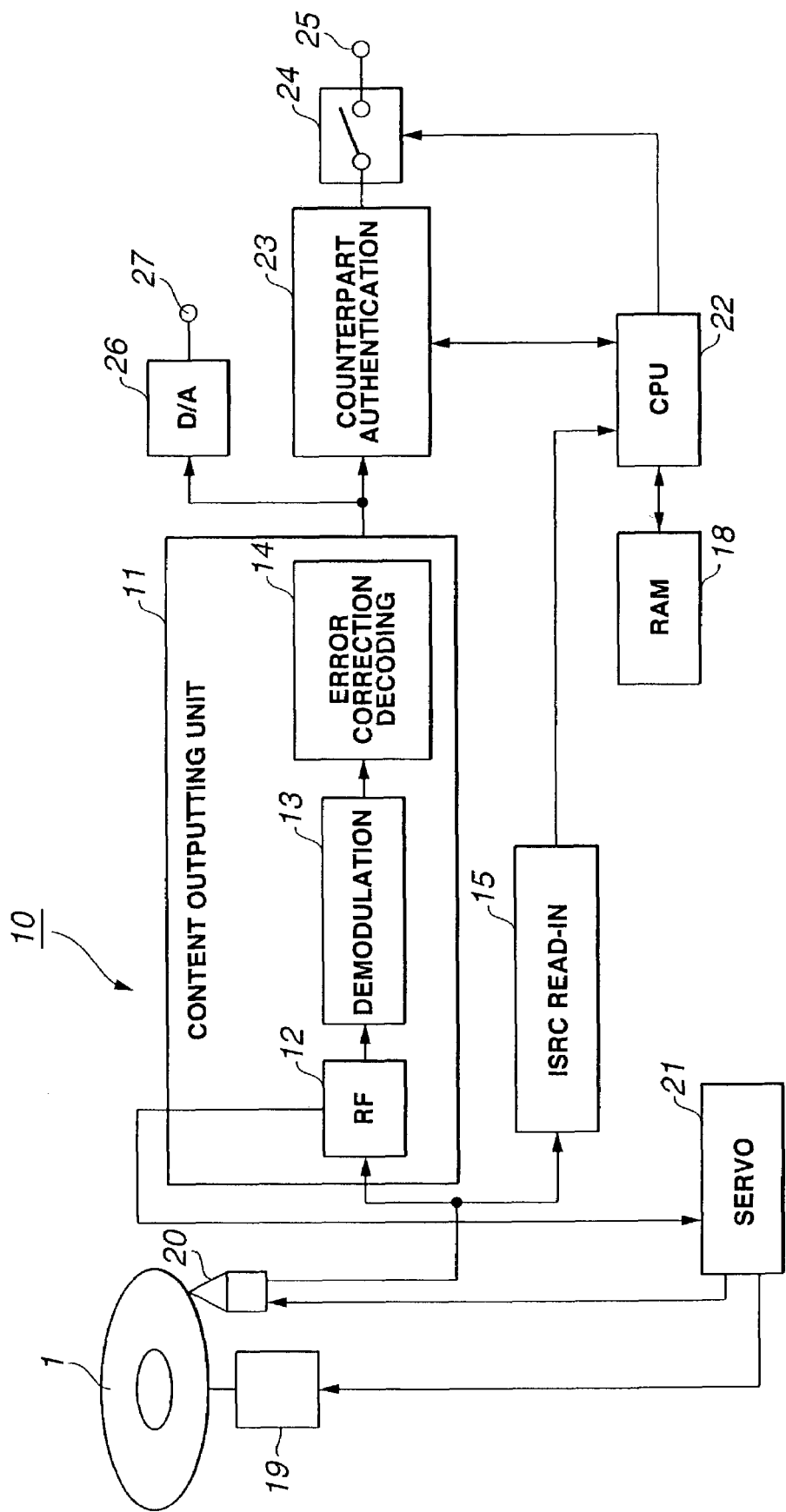
FIG. 1 is a block diagram showing the structure of an audio data reproducing apparatus according to a first embodiment of the present invention.

Referring to the drawings, a first embodiment of the present invention is hereinafter explained.

An audio data reproducing apparatus, to which are applied the reproducing apparatus of a recording medium and the data outputting controlling method of the present invention, is explained with reference to FIG. 1.

This audio data reproducing apparatus 10 includes, as shown in FIG. 1, a content outputting unit 11 for reproducing and outputting music content data from the signals read out from an optical disc 1 as a digital recording medium, an identification information readout unit 15 for extracting and reading out the first identification information used for identifying the content as content data, which content data is based on the signals as read out from the optical disc 1, and a RAM 18 for at least storing the first identification information output from this identification information readout unit 15.

The audio data reproducing apparatus 10 also includes a spindle motor 19 for rotating the optical disc 1 at, e.g., the constant linear velocity, an optical pickup 20 for reading out the recording signals from the rotating optical disc 1, and a servo circuit 21 for controlling the rotation of the spindle motor 19 and for performing focusing servo and tracking servo for the optical disc 1 by the optical pickup 20. The optical pickup 20 is moved along the radius of the optical disc 1, by a feed unit, not shown, to scan the optical disc 1, on illuminating the laser light thereon, to read out content data recorded on the optical disc 1, that is the recording data.

In addition, the audio data reproducing apparatus 10 includes a CPU 22 for executing control processing as to whether or not the content data from the content outputting unit 11 is to be output directly as digital data, based on the number of the first identification information stored in the RAM 18, a counterpart authentication unit 23 for authenticating a counterpart to which the content outputting unit 11 is to output the content as digital data, a switching unit 24 for changing over the content data supplied from the content outputting unit 11 through the counterpart authentication unit 23, by the CPU 22, that is by a control signal derived from the results of authentication from the authentication unit 23, and a digital output terminal 25 for supplying the content data supplied from the switching unit 24 to an external equipment, that is to a counterpart electronic equipment authenticated by the counterpart authentication unit 23. The counterpart electronic unit refers to a device employing a magnetic disc, such as a recordable optical disc or a hard disc, or a semiconductor memory, as a recording medium, and which is able to record at least the content data output from the output terminal 25 on a recording medium.

Moreover, the audio data reproducing apparatus 10 includes a D/A converter 26 for converting the content data from the content outputting unit 11, as digital data, into analog signals, and an analog output terminal 27 for supplying an analog signal output from the D/A converter 26 to an outside equipment. The equipment to be supplied with the analog signals from the analog output terminal 27 may be exemplified by an amplifier and a loudspeaker, in addition to the above-mentioned devices employing the recording mediums.

The content outputting unit 11 is made up by an RF amplifier 12, a demodulating circuit 13 and an error correction decoding circuit 14. The content outputting unit 11 amplifies the signal read out from the optical disc 1 by the optical pickup 20, that is the output signal from the optical pickup 20, by the RF amplifier 12, demodulates the RF signals, as output signals from the RF amplifier 12, and decodes the output data from the demodulating circuit 13 by the error correction decoding circuit 14 to output the resulting content data.

The RF amplifier 12 binary-encodes the output signal from the optical pickup 20 to send the resulting binary signals to the demodulating circuit 13. The RF amplifier 12 separates synchronization signals from the RF signals and generates tracking error signals and focusing error signals, based on the output signal from the optical pickup 20, to send the resulting signals to the servo circuit 21.

The demodulating circuit 13 subjects the RF signals, supplied from the RF amplifier 12, to the processing of demodulation, as a reverse operation to modulation applied in recording the content data on the optical disc 1, such as the processing of converting 16 channel bits, binary-coded from the signals read out from the optical disc 1, into 8-bit data which prevails prior to recording on the optical disc 1. The digital data, as output data from the demodulating circuit 13, is sent to the error correction decoding circuit 14.

The error correction decoding circuit 14 subjects the output data from the demodulating circuit 13 to error detection and correction to detect and correct errors by the error correction code applied at the time of error correction processing performed in recording the content data on the optical disc 1. The digital data, as content data output from the error correction decoding circuit 14, is sent to the counterpart authentication unit 23 and to the D/A converter 26.

The identification information readout unit 15 extracts and reads out the first identification information, used for specifying the content data recorded as content data on the optical disc 1, from the signal read out by the optical pickup 20 from the optical disc 1. As the first identification information, the International Standard Recording Code (ISRC) is used, because the content reproduced by the audio data reproducing apparatus 10 is music content. By this ISRC, the titles of the music contents, as the content recorded as content data on the optical disc, may be determined unequivocally.

The RAM 18 memorizes the ISRC data, as the first identification information read out by the identification information readout unit 15, under control by the CPU 22.

The optical pickup 20 includes a light source of a light beam, such as a laser diode, optical components, such as a collimator lens, an objective lens, a polarizing beam splitter, or a cylindrical lens for generating the focusing error signals, and a photodetector, such as a photodiode. The optical pickup 20 focuses the laser light as light beam radiated from the laser diode, on a signal recording surface of the optical disc 1, by the objective lens, and separates the return light from the signal recording surface of the optical disc 1 by the polarizing beam splitter from the laser light radiated from the light source, for detecting the so separated return light by the photodetector. An output detection signal from the photodetector of the optical pickup 20 is-sent to the RF amplifier 12 as readout signal of the optical disc 1.

The servo circuit 21 performs rotational control of the spindle motor 19 as well as tracking and focusing servo for the optical pickup 20 based on the synchronization signal supplied from the RF amplifier 12 and on the tracking and focusing error signals generated in the RF amplifier 12. The optical pickup 20 includes an actuator, not shown, for driving the objective lens in the focusing direction parallel to the optical axis thereof and in the tracking direction or in the planar direction perpendicular to the optical axis, based on focusing and tracking servo signals, derived from the focusing error signals and the tracking error signals, respectively.

The counterpart authentication unit 23 authenticates a counterpart to which the content outputting unit 11 is to output the content data in the state of digital data. Specifically, the counterpart authentication unit 23 authenticates whether or not the external equipment to be connected through the digital output terminal 25 is a recorder, and sends the result of authentication to the CPU 22. The counterpart authentication unit 23 authenticates whether or not the external equipment connected to the output terminal 25 is a device having the recording function for a recording medium as described above, that is a recorder, based on, for example, the IEEE1394 standard. In case of failure on the part of the counterpart authentication unit 23 in correctly authenticating the recorder as external equipment connected to the output terminal 25, the CPU 22 inhibits outputting of content data in the form of digital data from the output terminal 25.

If the result of authentication from the counterpart authentication unit 23 indicate a recorder, the CPU 22, which may, for example, be a micro-computer, causes the ISRC data, as first identification information read out by the identification information readout unit 15, to be stored in the RAM 18. Each time the content data corresponding to the signals read out from the optical disc 1 is recorded on or output to the RAM 18, that is copied thereon, ISRC data are stored in the RAM 18. Based on the number of the ISRC data, stored in the RAM 18, the CPU 22 controls the changeover processing of the switching unit 24, each time the content data output from the content outputting unit 11 is recorded, that is copied, in the recorder, to control the outputting of the content data from the content outputting unit 11.

In particular, when a preset number of the ISRC data have been stored in the RAM 18, the CPU 22 turns off the switching unit 24 to inhibit the outputting of the content data from the content outputting unit 11. An indication to the effect that the content as specified by the user cannot be copied is demonstrated at this time on a display, not shown, provided in the reproducing apparatus 10, by way of intimation of such effect to the user. If the preset number of the contents have not been stored in the RAM 18, the CPU 22 turns on the switching unit 24 to send the content data from the content outputting unit 11 through the digital output terminal 25 to the recorder as the outside equipment. It should be noted that, in this case, the content data are sent to the recorder when the recorder as the external equipment connected to the output terminal 25 has been correctly authenticated by the counterpart authentication unit 23. At the same time as the content data is output from the output terminal 25, 4-bit data indicating the number of copies of the RAM 18 is rewritten by the CPU 22 so that the data is counted up by one.

When the content data which is based on the signal read out from the optical disc 1 is copied by the recorder, the audio data reproducing apparatus 10 shown in FIG. 1 causes the CPU 22 to check whether or not the number of the first identification information, that is the ISRC data, stored in the RAM 18, is equal to the preset number. Based on the result of this check, limitations are imposed on the number of copies.

In this manner, the number of copies is controlled, based on the ISRC data accorded in association with the content data recorded in each optical disc. For example, if up to three copies of the content data as digital data is allowed, copying (dubbing) to the RAM 18 is allowed until the number three of the ISRC data is reached.

Thus, according to the present invention, employing the audio data reproducing apparatus 10, the number of copying operations executed is not managed by the recorder, but is managed by the reproducing apparatus, so that the number of content data output is controlled so as not to be larger than the allowed number, whereby it is possible to reliably prevent the large number of content data from being sent to and copied by the recorder.

The audio data reproducing apparatus 10, shown in FIG. 1, executes the data outputting method of the present invention as an apparatus. That is, each time the content data recorded on the optical disc 1 is reproduced and the content data corresponding to the signals read out from the optical disc 1 is recorded on or output to the recorder, the audio data reproducing apparatus 10 causes the ISRC data, read out by the identification information readout unit 15, to be memorized in the RAM 18. When the number of the ISRC data stored in the RAM 18 is equal to the preset number, the audio data reproducing apparatus 10 operates to inhibit the outputting of the contents data from the content outputting unit 11. Thus, if the number of the ISRC data stored in the RAM 18 is less than the preset number, the content data is output from the content outputting unit 11 until the preset number is reached.

The audio data reproducing apparatus 10, shown in FIG. 1, authenticates whether or not the external device connected thereto via digital output terminal 25 is a recorder. If the recorder as the external equipment connected via digital output terminal 25 has not been correctly authenticated by the counterpart authentication unit 23, the audio data reproducing apparatus 10 operates for inhibiting the outputting of the content data as digital data from the output terminal 25. By controlling the number of the content data from the output terminal 25, and by controlling the outputting of the content data on the condition that the recorder connected to the digital output terminal 25 is authenticated, it is possible to limit the outputting of useless content data to achieve reliable copying management as well as highly reliable control of unauthorized copying of the content data.

Figure 2:
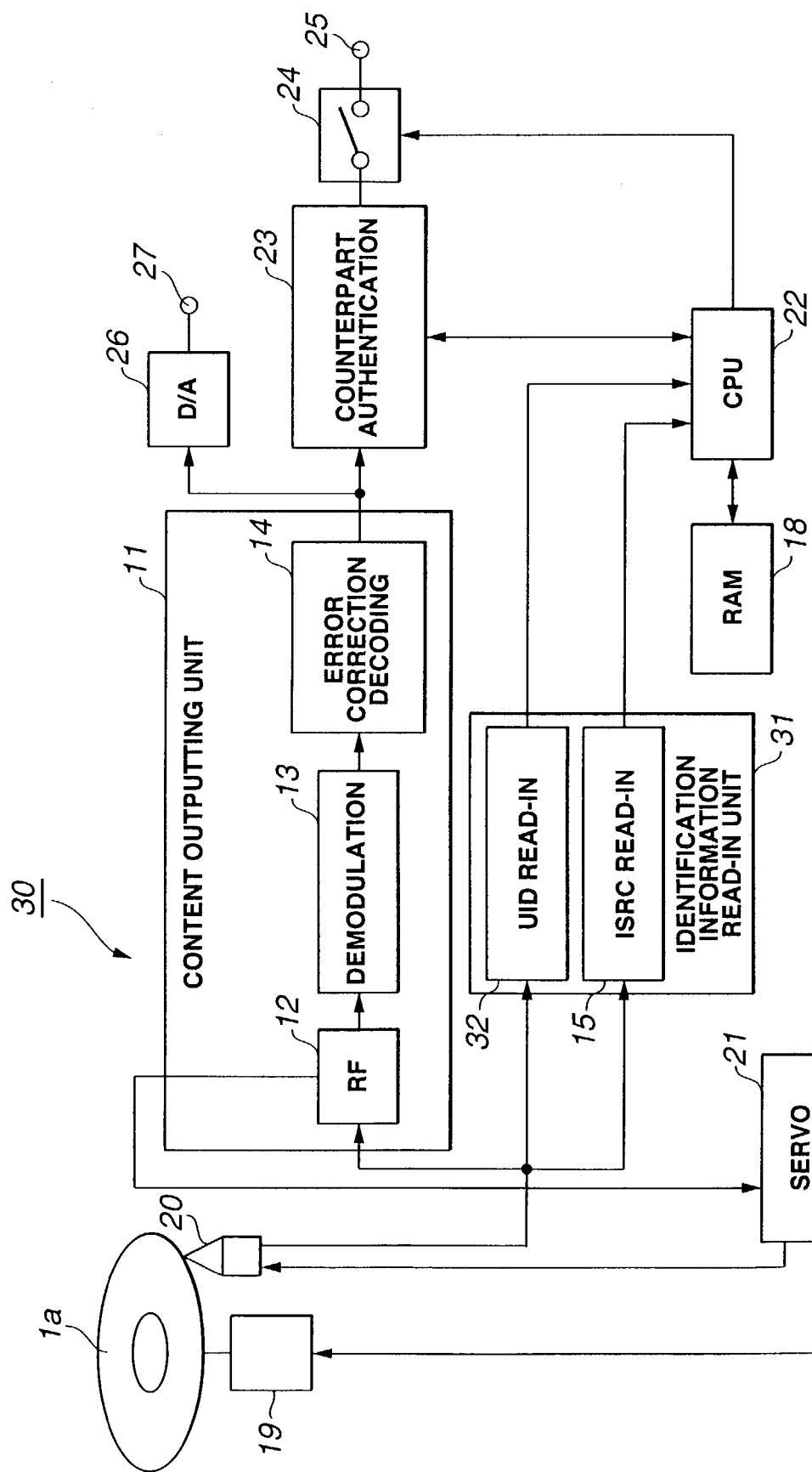
FIG. 2 is a block diagram showing the structure of an audio data reproducing apparatus according to a second embodiment of the present invention.

Referring to FIG. 2, an audio data reproducing apparatus 30 according to a second embodiment of the present invention is explained.

The audio data reproducing apparatus 30, shown in FIG. 2, also reproduces and outputs music content data from the signals read out from an optical disc 1a. The structure as the reproducing device of the audio data reproducing apparatus 30 is substantially similar to that of the audio data reproducing apparatus 10. However, the two apparatuses differ as to the structure of the identification information readout unit. The parts or components the audio data reproducing apparatus 30 own in common with the audio data reproducing apparatus 10 are depicted by the same reference numerals and the detailed explanation thereof is omitted for simplicity.

That is, the audio data reproducing apparatus 30 shown in FIG. 2 has, as an identification information readout unit 31, an ISRC readout unit 15 for reading out, from the signals read out by the optical pickup 20 from the optical disc 1a, the ISRC data for identifying the contents recorded on the optical disc 1a as content data, similar to the identification information readout unit 15 shown in FIG. 1, and a UID readout unit 32 for reading out the subject identification information (Unique Identification or UID), as the second identification information for discriminating the optical disc 1a as a subject, that is for discriminating each optical disc 1a. This subject identification information is referred to below as the UID data. The optical discs 1a, used here, have the ISRC data for identifying the contents in common, but have different UID data, so that the optical discs are handled as having different content data.

Figure 3:
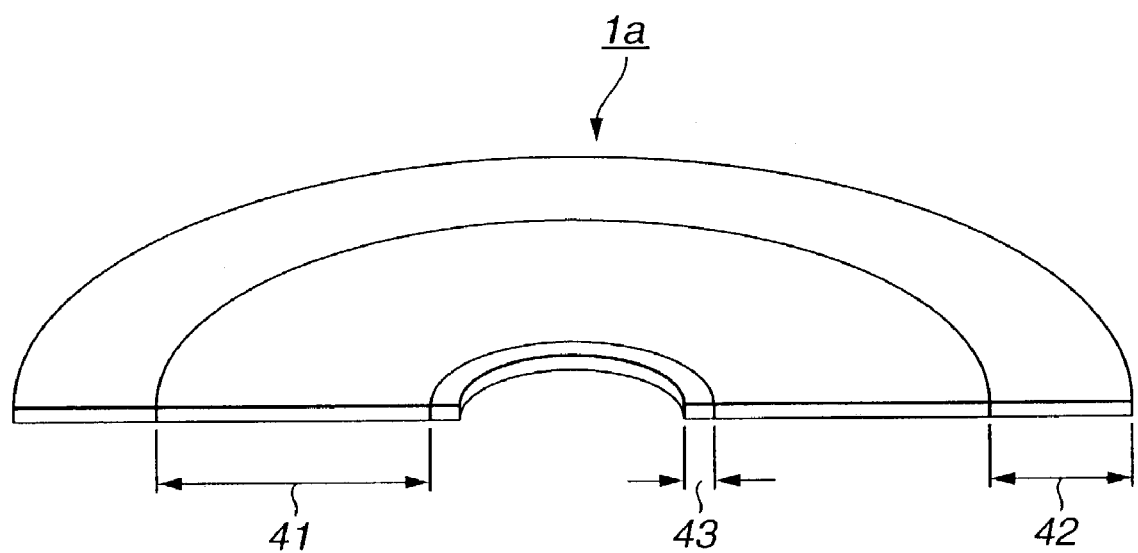
FIG. 3 illustrates a recording area of an optical disc employed in the second embodiment.

The optical disc 1a, reproduced by the present audio data reproducing apparatus 30, has two recording areas, namely an inner peripheral side recording area 41 and an outer peripheral side recording area 42, as shown in FIG. 3. In the inner peripheral side recording area 41, there are recorded data pertinent to music content in a format compatible with the so-called compact disc. The data recorded in this inner peripheral side recording area 41 may be data, such as text data, recorded in a format compatible with the format of the so-called CD-ROM disc, in addition to the data concerning the music content. The data recorded in the outer peripheral side recording area 42 is made higher in recording density than that recorded in the inner peripheral side recording area 41. For example, if the track pitch of the recording track of the inner peripheral side recording area 41 is 1.6 µm, as in the case of the compact disc, the track pitch of the outer peripheral side recording area 42 is made narrower than 1.6 µm to elevate the recording density of the outer peripheral side recording area 42. In this outer peripheral side recording area 42, there is recorded encrypted content data, such as music data, or data that can be read out by the replay-only reproducing device.

On a further inner peripheral side with respect to the inner peripheral side recording area 41 of the optical disc 1a, there is provided a lead-in area 43 in which there is recorded the aforementioned UID data. The UID data is recorded in the optical disc 1a by employing a material comprised of a mixture of aluminum and preset metal, as a material of a reflecting layer of the optical disc 1a, and by illuminating the laser light sufficiently higher in output signal level than the laser light used for reading out the signals recorded on the optical disc 1a. The UID data may be recorded in accordance with the BCA system recording the data using a YAG laser such as is used in DVD (Digital Versatile Disc).

Figure 4:
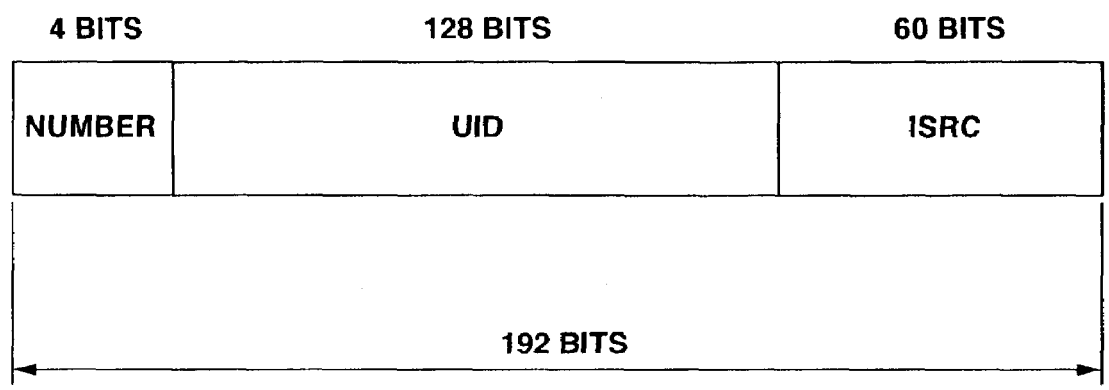
FIG. 4 is a diagrammatic view showing a data format of UID data and ISRC data per one content recorded on a RAM.

The optical disc 1a, from which audio data is reproduced in the present invention, is not limited to the disc shown in FIG. 3, while the recording site of the UID data is not limited to the lead-in area. The UID data is read out from the optical disc 1a as the optical pickup 20 is moved to a lead-in area 43 of the optical disc 1a. The so read out UID data is sent to the UID readout unit. The UID readout unit 32 extracts the UID data of the signals supplied from the optical pickup 20 to decode the so extracted UID data. The so read out UID data is combined with the ISRC output from the readout unit 15 so as to be stored via CPU 22 in the RAM 18. FIG. 4 shows a concrete example of a data format of UID data and ISRC data per content, as recorded in the RAM 18. In the case of music contents, each title is uniquely determined by the ISRC data. Thus, ISRC data is written in the RAM, for management, in combination with the UID data.

On the RAM 18, four bits are allocated for specifying the number of copies, 128 bits are allocated to the UID data and 60 bits are allocated to the ISRC data, respectively. These four bits, indicating the number of the copies, are not needed in a system where the copy limitation number is one. In a system where the copy limitation number is up to three or up to five, the four bits indicating the limitation number are needed.

In the embodiment shown in FIG. 4, the number of bits per content is 192. If the sets of the identification information for 5000 music airs are to be input by the data structure shown in FIG. 4, the RAM 18 needs to have a storage capacity of 1 M bits.

The operation of the audio data reproducing apparatus 30, shown in FIG. 2, is now explained. The following explanation is pertinent to the operation of the audio data reproducing apparatus 30 responsive to a copying request, accompanied by content designation, by the user. To the digital output terminal 25, the recorder having the recording function for the recording medium is connected, as aforesaid, as an external equipment.

When the user has input a request for copying the content data, the CPU 22 causes the spindle motor 19 to run the optical disc 1a in rotation at e.g., the constant linear velocity. At this time, the UID data read out from the lead-in area 43 of the optical disc 1a by the optical pickup 20 and the ISRC data of the relevant content are sent to the ISRC readout unit 15 and to the UID readout unit 32 making up the identification information readout unit 31. From the readout units 15, 32, the ISRC data and the UID data are supplied to the CPU 22, respectively. The CPU 22 causes the ISRC data and the UID data to be written in the RAM 18 in accordance with the data format shown in FIG. 4.

The content outputting unit 11 then binary-encodes the output signal of the optical pickup 20 by the RF amplifier 12 and demodulates the binary-coded signals by the demodulating circuit 13. The demodulated data are corrected for errors in the error correction decoding circuit 14 and the resulting digital data is sent as content data through the counterpart authentication unit 23 to the switching unit 24. Based on, for example, the IEEE1394 standard, the counterpart authentication unit 23 verifies whether or not the external equipment connected to the digital output terminal 25 is an equipment having the function of recording for the recording medium, as described above, and sends the results of authentication to the CPU 22. The CPU 22 then performs switching control for the switching unit 24 based on the results of authentication supplied from the counterpart authentication unit 23. For example, if the counterpart authentication unit 23 has been unable to authenticate correctly that the external equipment connected by the counterpart authentication unit 23 to the output terminal 25 is a recorder satisfying the IEEE 1394 standard, the CPU 22 manages control to turn the switching unit 24 off. If on the other hand the external equipment has been authenticated correctly, the CPU 22 manages control to turn the switching unit 24 on.

The CPU 22 proceeds to read the combination of the ISRC data concerning the content as specified by the user and the UID data of the optical pickup 1a (format shown in FIG. 4) in the RAM 18 to confirm the copy limitation number of four bits. Based on the four-bit data, indicating the copy limitation number, the CPU 22 verifies whether or not the content specified by the user has already reached the preset copy limitation number.

If the data indicating the four-bit copy limitation number, associated with the specified content, indicates that the preset number of data has already been output for the purpose of copying, that is if there is data indicating the preset number, the CPU 22 turns the switching unit 24 off. For example, in case production of up to three copies of the content data is allowed, that is if the data indicating the four-bit copy limitation number is data already indicating this limiting number, the CPU 22 turns the switching unit 24 off. That is, the content data supplied from the content outputting unit 11 is not output from the digital output terminal 25. At this time, an indication is made for the user on a display, not shown, provided on the audio data reproducing apparatus 30, to the effect that copying is not allowed.

If it is found by checking the four-bit data indicating the number of copies, stored in the RAM 18, that the preset number of the content as specified has not been output for the purpose of copying, that is, if it is found that the four-bit data indicating the number of copies is not as yet the data indicating the preset number, the switching unit 24 is turned on, at the same time as the four-bit data, which indicates the copy number limitation, is stored in the RAM 18, and which is associated with the content data specified by the user, is rewritten so as to be counted up by '1'. So, the content data as the digital data sent from the content outputting unit 11 is sent to the digital output terminal 25. It should be noted that, in this case, the content data is output from the output terminal 25 only when the recorder connected to the output terminal 25 has been authenticated by the counterpart authentication unit 23 before outputting the content data, as in the case of the aforementioned audio data reproducing apparatus 10.

However, the analog signals of the content, converted by the D/A converter 26, are output via an analog output terminal 27, to the external equipment, without regard to whether or not the four-bit data indicating the copy number limitation is the data indicating the preset number.

Meanwhile, in this audio data reproducing apparatus 30, the optical disc 1a, loaded on the apparatus 30, is handled as being a different optical disc, if the UID data differs, even though the ISRC data is the same. If the optical disc devoid of the UID data, for example, the commercially available compact disc, is loaded on the apparatus 30, the apparatus handles the UID data as being all '0' data.

As described above, the audio data reproducing apparatus 30 causes its CPU 22 to decipher whether or not the number of the ISRC data and the UID data stored in the RAM 18, that is the four-bit data indicating the copy limitation number shown in FIG. 4, has become equal to the preset number, in order to control the copying operation. So, the copying of the content data is controlled as a function of the number of copies allowed for one content data and the number of optical discs 1a having stored thereon the content data. That is, the user who owns plural optical discs 1a having recorded thereon the same content is able to prepare an allowed number of copies of the same content data depending on the number of the optical discs 1a the user owns.

According to the present invention, in which the number of copies of the content data is managed on the part of the recorder, through use of the audio data reproducing apparatus 30, the possible number of copies may be managed on the part of the reproducing apparatus. As a consequence, the content data may be prevented from being limitlessly output from the reproducing apparatus in the state of digital data, and also from being limitlessly supplied in the state of digital data to the recorder, and hence the unauthorized copying of the content data may be prevented more reliably from occurring.

The user owning plural optical discs, having the same content data recorded thereon, may obtain a number of copies corresponding to the number of the discs the user owns. Thus, the user may enjoy the benefit accrued from the fact of possessing plural optical discs 1a.

Figure 5:
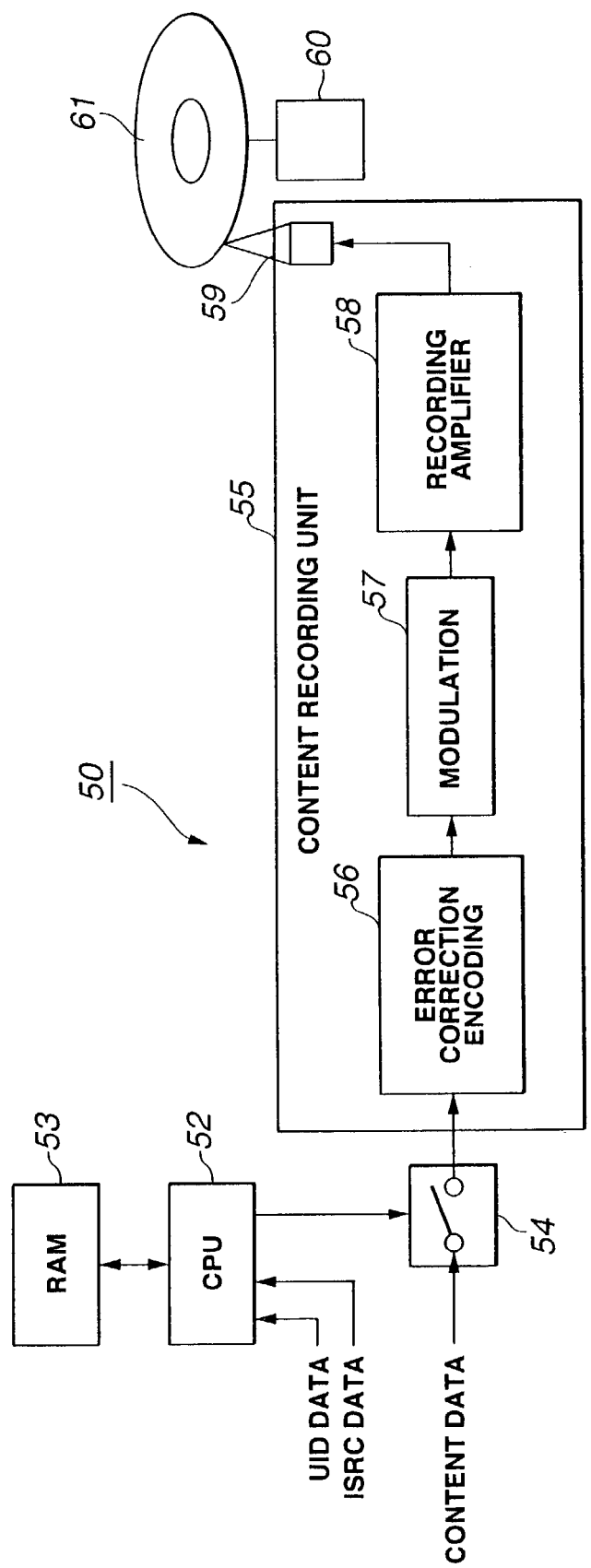
FIG. 5 is a block diagram showing the structure of an audio data recording apparatus according to a third embodiment of the present invention.

Referring to FIG. 5, an audio data reproducing apparatus 50 according to a third embodiment of the present invention is hereinafter explained.

The audio data reproducing apparatus 50 limits the number of copies of the content data on the part of the recorder. The recording apparatus 50 includes a content recorder 55 for recording the content data read out from the replay optical disc, for example, the content data supplied from e.g., the IEEE 1394 standard connection cable, on another data recording medium, for example, a recording optical disc 61, a RAM 53 for memorizing the ISRC data for identifying the content and the UID data for discriminating the replay optical disc as a subject from other replay optical discs, and a CPU 52 for controlling the content recording by the content recorder 55 based on the number of the ISRC data and the UID data stored in the RAM 53. The recording optical disc 61 used may be a write-once optical disc or a magneto-optical disc employing an organic dye or a phase change type optical disc.

The digital data, as the content data, among the content data reproduced from the optical disc, the ISRC data and the UID data, is sent through a switching device 54 to the content recorder 55.

The content recorder 55 is made up by an error correction encoding circuit 56, a modulation circuit 57, an RF amplifier 58 and a recording optical head 59. The recording optical head 59 is moved by a feed mechanism, not shown, from an innermost rim position to the outermost rim position of the recording area of the optical disc for recording 61. The error correction encoding circuit 56 performs error correction encoding on the digital data as content data supplied from the switching device 54. The modulation circuit 57 modulates the data supplied from the encoding circuit 56 into modulated data, in accordance with a preset modulation system, by for example converting e.g., the 8-bit data into 16-channel bit modulated data, which are then output to the recording amplifier 58. Output data from the modulation circuit 57 is supplied through the recording amplifier 58 to the recording optical head 59, which recording optical head 59 then records the digital data as the content data on the recording optical disc 61.

The RAM 53 memorizes the ISRC data and the UID data, supplied thereto as the data are reproduced from the optical disc, not shown, content by content, in accordance with the format shown in FIG. 4, under control by the CPU 52. The CPU 52, made up by a micro-computer, reads the ISRC data concerning the content specified by the user, and the UID data of the optical disc, from the RAM 53, in which the data have been written based on the format shown in FIG. 4. The CPU confirms the four-bit data, indicating the number of copies, to verify whether the preset number of copies have already been prepared, or whether the recording operation is to be executed.

If the preset number of the content specified by the user has already been recorded for the purpose of copying, the CPU 52 turns the switching device 54 off, so that the digital data of the content is not sent to the content recorder 55. At this time, a message to the effect that content data cannot be recorded, that cannot be copied, is demonstrated on a display, not shown, provided to the recording apparatus 50.

If the data indicating the number of copies, read out from the RAM 58, under control by the CPU 52, indicates on the other hand that the preset number of copies has as yet not been copied, the CPU 52 causes the switching device 54 to be turned on, while rewriting the four-bit data of the UID data and the ISRC data for the content specified by the user, as stored in the RAM 53, for indicating the copy number, so that the data will be counted up by '1'. Thus, the content recorder 55 performs the aforementioned recording processing on the digital data, as the content data, supplied through the switching device 54, in order to record the digital data as the content data on the recording optical disc 61, rotated at e.g., the constant linear velocity by the spindle motor 60.

Thus, the audio data reproducing apparatus 50, shown in FIG. 5, causes its CPU 52 to verify whether or not the number of the copies on the RAM 53 of the ISRC data and the UID data of the content data to be recorded has become equal to the preset number, in order to control the recordability of the digital data as the content data. The number of copies can be detected on the basis of the copy number limitation of the content data and the number of the optical discs having recorded thereon the content data for recording.

Meanwhile, in this audio data reproducing apparatus 50, the content data about to be recorded is again handled as distinct data if the ISRC data is the same but the UID data is not. In the case of the content data devoid of the UID data, for example, the content data read out from the commercially available compact disc, the UID data is handled as being all '0' data.

The present invention can be modified by the skilled artisan within the scope not departing from the purport of the invention. That is, in the above-described embodiment, the ISRC is used as the identification information for specifying the content data recorded or output. Alternatively, any suitable identification information capable of discriminating the content data from other data may be used. Specifically, any suitable identification information inherent to the content data may be used.

In the present invention, described above, an optical disc is taken as an example as a recording medium on which the content data is recorded. As the recording medium, a memory card employing a semiconductor memory may be used in addition to the disc-shaped recording medium. In the case of the memory card, the UID disc is provided in an electrically or physically decipherable manner on the memory card.

INDUSTRIAL APPLICABILITY

According to the present invention, described above, the identification information for discriminating at least the content of content data is held each time the content data is read out and output along with the content data from a recording medium, on which the identification information has been stored along with the content data, and the outputting of the content data as read out form the recording medium is controlled depending on whether or not the identification information as held meets a preset condition. The number of the output content data stored on the recording medium can be controlled in this manner to prevent the content data from being limitlessly supplied as digital data to external equipment, such as a recorder, to render it possible to reliably prohibit inadvertent or illicit copying of content data.

The invention claimed is:

1. A reproducing apparatus for use with a plurality of recording media, said reproducing apparatus comprising:
   a head for scanning a recording medium having recorded thereon content data, content identification information for discriminating at least a content of said content data and unique medium identification information for uniquely identifying the recording medium, and for supplying an output signal therefrom;
   a reproducing processing unit for receiving the output signal from said head and for processing reproduced content data obtained therefrom so as to provide processed digital content data and analog content data;
   an identification information extracting unit for extracting the content identification information and the medium identification information corresponding to the content of the processed digital content data and the recording medium scanned to produce the processed digital content data;
   an output controlling unit for controlling outputting from said reproducing apparatus; and
   an authentication unit for authenticating whether or not an external device which is connected to the reproducing apparatus to be supplied with said processed digital content data is a recorder,
   wherein said output controlling unit includes a storage unit for holding said content identification information and said unique medium identification information extracted by said identification information extracting unit each time said processed digital content data is output, wherein said output controlling unit is operable to enable the outputting of specific content data of said processed digital content data to the external device when the external device has been correctly authenticated by said authentication unit as being a recorder and only when a number of copies made of the specific content data by said reproducing apparatus is less than or equal to a preset number representative of a maximum allowable number of copies of the specific content data, said maximum allowable number being a function of the number of copies allowed for the specific content data and the number of distinctly identified units used in the reproducing apparatus which contain the content data, and wherein said analog content data from said reproducing processing unit is outputable regardless of the number of times said analog content data is outputted.

2. The reproducing apparatus for the recording medium according to claim 1, wherein said output controlling unit includes a controller and a switching unit that is changed over under control of said controller.

3. A data outputting controlling method comprising the steps of:

scanning a recording medium to extract information recorded thereon including content data, content identification information, and unique medium identification information;

processing said content data so as to provide processed digital content data and analog content data;

each time said processed digital content data are output, holding said content identification information that is read out;

controlling an outputting of the processed digital content data;

authenticating whether or not an external device which is connected to the reproducing apparatus to be supplied with said processed digital content data at a time of outputting said processed digital content data is a recorder; and storing said extracted content identification information and said extracted unique medium identification information as a set in a storage unit for subsequent use in said step of controlling the outputting of said processed digital content data, wherein the outputting of said processed digital content data is controlled such that specific content data of said processed digital content data is outputted to a recorder only when only when a number of copies made of the specific content data by said reproducing apparatus is less than or equal to a preset number representative of a maximum allowable number of copies of the specific content data, said maximum allowable number being a function of the number of copies allowed for the specific content data and the number of distinctly identified units used in the reproducing apparatus which contain the content data, and wherein said analog content data is outputable regardless of the number of times said analog content data is outputted.

4. A data outputting controlling method for use with a reproducing apparatus, said method comprising the steps of:

scanning a recording medium to extract information recorded thereon including content data, content identification information, and unique medium identification information;

processing said extracted content data so as to provide processed digital content data and analog content data;

holding the extracted content identification information each time the processed digital content data is output;

controlling outputting of said processed digital content data;

authenticating whether or not an external device which is connected to the reproducing apparatus to be supplied with said processed digital content data is a recorder; and storing said extracted content identification information and said extracted unique medium identification information as a set in a storage unit for subsequent use in said step of controlling the outputting of said processed digital content data, wherein the outputting of said processed digital content data is controlled such that specific content data of said processed digital content data is outputted to a recorder only when (i) a number of copies made of the specific content data by said reproducing apparatus is less than or equal to a preset number representative of a maximum allowable number of copies of the specific content data, said maximum allowable number being a function of the number of copies allowed for the specific content data and the number of distinctly identified units used in the reproducing apparatus which contain the content data, and wherein said analog content data is outputable regardless of the number of times said analog content data is outputted.

5. A reproducing apparatus for use with a plurality of recording media each having content data recorded thereon such that at least one content on each of the recording mediums is the same, said reproducing apparatus comprising:

a head for scanning a respective recording medium having recorded thereon the content data, content identification information for identifying said content data, and unique medium identification information for identifying the respective recording medium, and for supplying an output signal therefrom;

a reproducing processing unit for receiving and processing the output signal from said head so as to obtain processed digital content data;

an identification information extracting unit for extracting the content identification information and the medium identification information from the output signal from said head;

an output controlling unit for controlling outputting from said reproducing apparatus; and an authentication unit for authenticating whether or not an external device which is connected to the reproducing apparatus to be supplied with said processed digital content data is a recorder, said output controlling unit having a storage unit for storing the unique medium identification information extracted by said identification information extracting unit, said content identification information extracted by said identification information extracting unit, and a copy number indicative of an actual number of times said processed digital content data obtained from the respective medium has been outputted from said reproducing apparatus, in which the copy number associated with each said respective medium is increased each time said processed digital content data obtained from the respective medium is outputted from said reproducing apparatus, and said output controlling unit being operable to enable the outputting of said processed digital content data to the external device only when (i) the external device has been correctly authenticated by said authentication unit as being a recorder and (ii) the copy number currently stored in the storage unit is less than or equal to a preset number representative of a maximum allowable number of copies of the specific content data, said maximum allowable number being a function of the number of copies allowed for the specific content data and the number of distinctly identified units used in the reproducing apparatus which contain the specific content data.

* * * * *